United States Patent Office 3,020,711
Patented Feb. 13, 1962

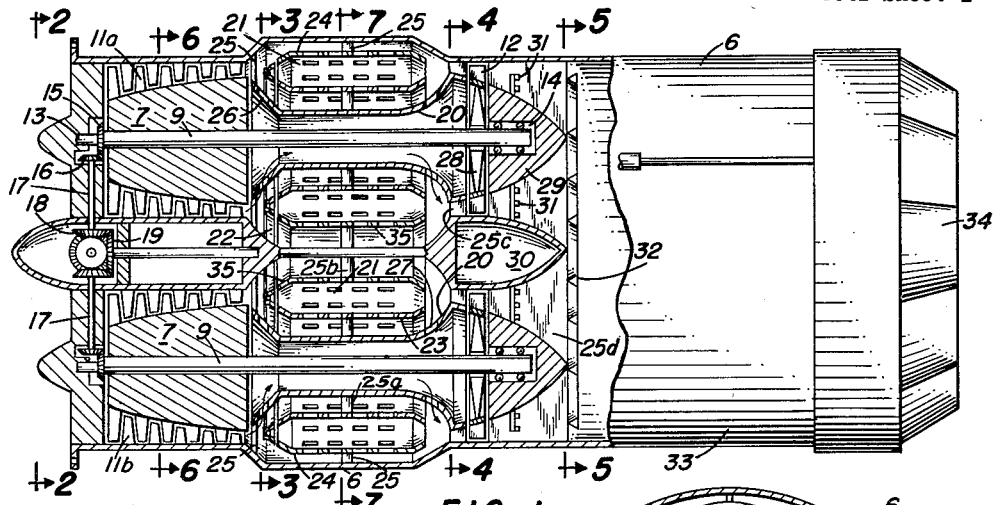

3,020,711
MULTIUNIT TURBOJET ENGINE
Robert W. Pinnes, Rockville, Md., assignor to the United States of America as represented by the Secretary of the Navy
Filed Feb. 11, 1957, Ser. No. 639,579
6 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The present invention relates to a multiunit turbojet engine and more particularly to a multiunit turbojet engine having a plurality of basic units, each comprising a relatively small compressor and turbine.

From the very beginning of jet engine development, one of the continuing problems has been the determination of optimum engine size for a specific weight. Originally, the square-cube law was introduced, stating that, in general, the thrust of an engine increases as the square of the diameter, while the weight increases as the cube of the diameter. Therefore, the smaller the engine, the better the specific weight and shorter the length, down to a certain minimum value established by practical considerations.

Thus, to circumvent the square-cube law, which indicates that the larger turbojet engines needed for anticipated higher thrust requirements will have higher specific weight, there has been developed the present invention which has as a main characteristic a single engine made up of a plurality of compressor and turbine units. This construction incorporates the advantages of smaller specific weights, shorter lengths and yet satisfies the needed thrust requirements without the complexities of a large number of engines.

An important advantage of the present invention is the attainment of a complete spectrum of engine sizes based on a single unit. For example, the combining of identical compressor and turbine units each having a thrust of 2500 pounds will result in engines with thrust ratings of 5000, 7500, 10,000, 12,500, 15,000 lbs., etc.

The present invention also has the advantage of not increasing frontal area per unit of thrust. For current engines, the afterburner and exhaust nozzle (especially of the convergent-divergent type) represent the major diameter and therefore determine the frontal area. Consequently, the separate compressor units of the present invention will fit into the engine casing established by the aft end of the engine.

An object of the present invention is the provision of a turbojet engine to circumvent the square-cube law.

Another object is to provide a turbojet engine which combines the advantages of low specific weight and short length of small turbojet engines with the advantage of simplicity of installation and control of large turbojet engines.

A further object of the invention is the provision of a complete size spectrum of up to date turbojet engines with thrust ratings of any convenient multiple of a basic unit.

Still another object of the invention is to simplify the problem of developing very large thrust engines.

Other objects and many of the attendant advantages of this invention will be readily appreciated as the same becomes better understood by reference to the following detailed description when considered in connection with the accompanying drawings wherein:

FIG. 1 shows a side view, partly in section, of a preferred embodiment of the invention.

FIG. 2 is an end view of the engine partly in section with parts omitted, taken on the line 2—2 of FIG. 1.

FIG. 3 is a section of the engine taken on line 3—3 of FIG. 1.

FIG. 4 is a section of the turbines of the engine taken on line 4—4 of FIG. 1.

FIG. 5 is a section taken on line 5—5 of FIG. 1.

Figure 6:
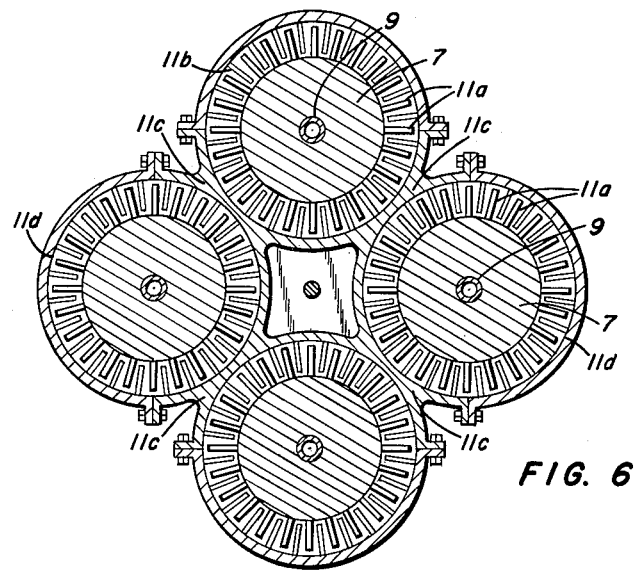
FIG. 6 is a sectional view taken on the line 6—6 of FIG. 1.
Figure 7:
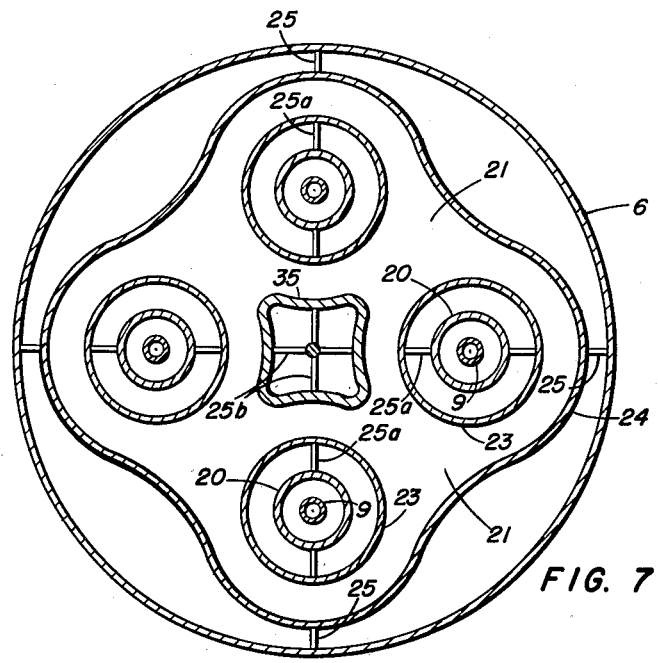
FIG. 7 is a sectional view taken on the line 7—7 of FIG. 1.

Referring now to the drawings, wherein like reference characters designate like or corresponding parts throughout the several views, there is show in FIG. 1 a multiunit turbojet engine having a casing 6 enclosing a plurality of basic units 7 which are each made up of a compressor 11 mounted on the upstream end of a rotatable shaft 9 and a turbine 12 mounted on the down-stream end of the rotatable shaft 9. Said compressor 11 having rotor blades 11a and stator blades 11b. A portion of said stator blades 11b being carried by stator blade supporting member 11c and the remaining portion of the stator blades 11b being carried by the inner wall 11d of the casing 6. The ends of shafts 9 are rotatably mounted in bearings 13 and 14. The shafts 9 of each basic unit 7 are synchronized together by means of pinion gears 15 fixed to the upstream ends of shafts 9 engaging pinion gears 16 fixed to one end of shafts 17, pinion gears 18 fixed to the other ends of shafts 17, and idler gears 19 engaging all of the pinion gears 18.

A single combustion chamber 21, having as its innermost walls perforated shrouds 23, and as its outermost walls, perforated shrouds 24 and 35 is positioned within the casing 6 enclosing the shafts 9 and between compressors 11 and turbines 12. Fuel spray nozzles 22 are positioned downstream from the outlets of the compressors 11.

A cooling shroud 20 (FIGS. 1 and 3) surrounds each of the shafts 9 which extends through the combustion chamber 21. Inner perforated shroud 35, intermediate perforated shrouds 23 and outer perforated shroud 24 are positioned about the combustion chamber 21 and form the walls thereof. Radial supports 25 are provided to support outer shroud 24 while intermediate shrouds 23 are supported by radial supports 25a, 25c and inner shroud 35 is supported by radial supports 25b. The space between intermediate shrouds 23, outer shroud 24 and inner shroud 35, forming combustion chamber 21, provides a channel for air sucked through the perforations and fuel from the fuel spray nozzles 22 to be combusted together and the gases therefrom supplied to the inlets of the turbines 12.

The shafts 9 between the compressors 11 and turbines 12 are kept cool by ducting some of the cool air exhausted from the outlets of the compressors 11 through upstream openings 26 and downstream openings 27 in the cooling shrouds 20. The arrows shown in FIG. 1 illustrate the path taken by the cool air through the openings 26 and 27 in the cooling shrouds 20.

The blades of the turbine rotor 12 are supported by a conventional turbine disc 28. The cool air used to cool the shafts 9 also cools the turbine rotor 12, thus improving the ability of the rotor to carry the necessary loads.

Bearings 14 which rotatably mount the downstream ends of the shafts 9 are secured in turbine exhaust fairings 29. Fairing 30, which is located intermediate fairings 29, serves to streamline the flow of gases leaving the turbine. Fuel spray bars 31 and circular flame holders 32 are mounted on the fairings 29 and support 25d and extend into the downstream end of the casing 6.

A single afterburner 33 and variable area exhaust nozzle 34 are joined to the downstream end of the casing 6 to receive the gases exhausted from the turbines 12.

In operation, air is compressed in the compressors 11 and exhausted into the single combustion chamber 21. Fuel is sprayed into the combustion chamber 21 by means of the fuel nozzles 22, generally in the space between the inner, intermediate and outer perforated shrouds 35, 23 and 24, respectively. Air outwardly of shroud 24 and inwardly of shroud 23 and 35 is drawn through the perforations in these shrouds to be mixed with the fuel-air mixture in the space between the shrouds. The gases resulting from the combustion are supplied to the inlets of the turbines 12. Additional fuel is mixed with the turbine exhaust gases by the fuel spray bars 31, and further combustion takes place in the afterburner 33. The gases then exhaust through the exhaust nozzle 34.

To simplify the control and starting problems, it is desirable to interconnect the basic units 7 so that they all run at exactly the same speed, although the elements may be mounted to run independently of each other. Further, half of the basic units 7 could be mounted to run clockwise and the other half counterclockwise which would completely eliminate all gyroscopic forces. The required engine accessories, can be installed within the spaces between the compressors and within casing 6.

The control and installation of the engine of this invention is the same as for a single large engine, with a single fuel system, single speed control, one set of engine accessories, etc. These elements are not disclosed herein, as they form no part of the present invention and are considered to be well known and standard equipment.

Obviously many modifications and variations of the present invention are possible in the light of the above teachings. It is therefore to be understood that within the scope of the appended claims the invention may be practiced otherwise than as specifically described.

I claim:

1. A multiunit turbojet engine comprising four rotatable parallel shafts, compressor units having rotor and stator blades, a compressor rotor drum carrying said rotor blades rotatably mounted on the upstream end of each of said shafts, a single stator blade supporting member in juxtaposition to said rotor drum carrying a portion of the stator blades for each of said rotor drums, a casing enclosing all four units, said stator blade supporting member being centrally mounted with said rotor drums equally spaced about the periphery thereof, the remaining stator blades being carried by the inner wall of said casing, a turbine rotatably mounted on the downstream end of each of said shafts, a common combustion chamber having a first and second outer wall, a first and second shroud forming said outer walls, a plurality of perforated shrouds forming the innermost walls of said common combustion chamber and enclosing each of said shafts, a cooling shroud of lesser diameter than and concentric with each of said last mentioned shrouds, said common combustion chamber being operatively positioned between said compressors and said turbines, and fuel supply means supplying fuel to said common combustion chamber, whereby the outlet of each of said compressors discharges air under pressure into said common combustion chamber, the inlets of said turbines are supplied with hot gases from said common combustion chamber and all of said hot gases exhaust from said engine through a common exhaust nozzle imparting thrust to said engine.

2. A multiunit engine having at least four basic units, each of said units comprising a compressor and a turbine interconnected by a common shaft, a common combustion chamber having a first and second outer wall, a first and second shroud forming said outer walls, a plurality of perforated shrouds forming the intermediate walls of said common combustion chamber, said common combustion chamber operatively positioned between said compressors and said turbines, and fuel supply means supplying fuel to said common combustion chamber whereby the outlets of said compressors discharge compressed air into said common combustion chamber, each of the inlets of said turbines are supplied hot gases from said common combustion chamber and all of said hot gases exhaust from said engine through a common exhaust nozzle imparting thrust to said engine.

3. A multiunit turbojet engine comprising a plurality of parallel shafts, compressor units having rotor and stator blades, a compressor rotor drum rotatably secured to the upstream end of each of said shafts, a single stator blade supporting member in juxtaposition to said rotor drums carrying stator blades for each of said compressors, a turbine rotatably secured to the downstream end of each of said shafts, a common combustion chamber formed by a plurality of spaced perforated shrouds, a cooling shroud concentric with and fixedly secured about each of said shafts, said common combustion chamber operatively positioned between said compressors and said turbines, fuel supply means supplying fuel to said common combustion chamber and air passage means in said cooling shroud upstream of said common combustion chamber for admitting cooling air around each of said shafts whereby the outlet of each of said compressors discharges air under pressure into said common combustion chamber, the inlet of each of said turbines receives hot gases from said common combustion chamber and all of said hot gases exhaust from said engine through a common exhaust nozzle imparting thrust to said engine.

4. The combination set forth in claim 1, and means connected to said shafts for synchronizing the speed of said shafts.

5. The combination set forth in claim 2 and means connected to said basic units for synchronizing the speed of said units.

6. The combination of claim 3 and means connected to said shafts for synchronizing the speed of said shafts.

References Cited in the file of this patent

UNITED STATES PATENTS

| | | |
|---|---|---|
| 2,601,194 | Whittle | June 17, 1952 |
| 2,613,749 | Price | Oct. 14, 1952 |
| 2,672,013 | Lundquist | Mar. 16, 1954 |
| 2,677,062 | Sedille | Apr. 27, 1954 |
| 2,760,338 | Keast | Aug. 28, 1956 |
| 2,791,090 | Hooker | May 7, 1957 |
| 2,880,573 | Karcher | Apr. 7, 1959 |
| 2,929,207 | Peterson | Mar. 22, 1960 |